United States Patent [19]
Porcaro et al.

[11] Patent Number: 5,323,640
[45] Date of Patent: Jun. 28, 1994

[54] AUTOMATED TESTING OF VEHICLE FUEL CAPS

[75] Inventor: Vincent J. Porcaro; Rinaldo Tedeschi, both of Newington, Conn.; Paul Greco, Tucson, Ariz.

[73] Assignee: Environmental Systems Products, Inc., East Granby, Conn.

[21] Appl. No.: 59,630

[22] Filed: May 10, 1993

[51] Int. Cl.⁵ .......................................... G01M 3/32
[52] U.S. Cl. .......................................... 73/40; 73/49.7
[58] Field of Search .................. 73/45.8, 49.7, 40

[56] References Cited

U.S. PATENT DOCUMENTS

| | | | |
|---|---|---|---|
| 2,847,851 | 8/1958 | Enell | 73/45.8 X |
| 2,940,301 | 6/1960 | Hughes et al. | 73/40 |
| 2,940,303 | 6/1960 | Enell | 73/49.7 X |
| 3,014,361 | 12/1961 | Black | 73/40 |
| 3,022,658 | 2/1962 | Black | 73/40 |
| 3,138,949 | 6/1964 | Pipes | 73/45.8 X |
| 4,235,100 | 11/1980 | Branchini | 73/49.7 |
| 4,494,402 | 1/1985 | Carney | 73/49.7 X |
| 4,794,790 | 1/1989 | Margarit-Metaxa et al. | |
| 5,146,902 | 9/1992 | Cook et al. | |
| 5,158,054 | 10/1992 | Otsuka | |

FOREIGN PATENT DOCUMENTS

| | | |
|---|---|---|
| 2635823 | 3/1990 | France |
| 663874 | 5/1979 | U.S.S.R. |

*Primary Examiner*—Hezron E. Williams
*Assistant Examiner*—Joseph W. Roskos
*Attorney, Agent, or Firm*—Schweitzer Cornman & Gross

[57] ABSTRACT

A method and apparatus for the testing of vehicle fuel tank caps includes the mounting of a cap to be tested upon a mating socket. The socket/cap combination define a sealed chamber which can be pressurized and/or evacuated in a controlled manner. A pressure transducer monitors the pressure within the chamber. The monitored pressure is compared to reference values to determine cap integrity. The apparatus may be incorporated into a vehicle testing system using microprocessor control and having a database of vehicle, cap and performance data.

11 Claims, 2 Drawing Sheets

AUTOMATED TESTING OF VEHICLE FUEL CAPS

The present invention relates to a new and improved method for conducting a test of a vehicle fuel cap and an apparatus by which the methodology may be performed.

BACKGROUND OF THE INVENTION

The testing of the functional systems of automobiles, trucks and the like has progressed to the point that extremely sophisticated and detailed tests may be performed to insure both that the components of an automobile are working properly from a mechanical and electro-mechanical point of view, and that system performance is in accordance with mandated guidelines, whether they be on the federal, state or local level. The federal Environmental Protection Administration (EPA), for example, has promulgated extensive regulations limiting the emissions of motor vehicles. Typically, a battery of tests may be performed by a test technician utilizing computer-controlled interface and analysis system which provides essentially real time evaluation of the parameters under test.

One area in which test technology has lagged, however, is in the analysis of the system and components utilized to control fuel evaporation to the atmosphere from the fuel tank and associated piping. Such loss of fuel is both wasteful and environmentally unsound, as the evaporated fuel, in addition to creating a possibly dangerous situation, contributes to unwanted hydrocarbon pollution. Indeed, the EPA has imposed requirements that vehicle fuel evaporation control systems be inspected for proper performance. Typically, however, such inspections have been conducted manually, without the benefit of automated test procedures which would simplify the inspection and provide more reliable and consistent testing. In co-pending application Ser. No. 839,318 of Feb. 20, 1992 by the present invention, a method and system are disclosed for testing the integrity of the fuel evaporation control system of a vehicle. The testing is performed by the application of a pressure source to the fuel tank inlet. The removed fuel tank cap is thus not subject to testing. As the E.P.A. has identified fuel cap leaks as a main contributor to hydrocarbon emissions from passenger vehicles, the testing of fuel caps is an important anti-pollution action.

It is accordingly a purpose of the present invention to provide a method and apparatus for testing the integrity of a vehicle fuel tank cap.

Yet a further purpose of the present invention is to provide such an apparatus and method which permits testing to be conducted in an automated, non-intrusive manner.

Still a further purpose of the present invention is to provide such a method and apparatus which may be incorporated into existing test systems and test routines.

Still another purpose of the present invention is to provide such a method and apparatus which can provide both qualitative and quantitative measurements relating to the condition of the fuel tank cap.

BRIEF DESCRIPTION OF THE INVENTION

In accordance with the above and further purposes and features, the methodology of the present invention comprises the mounting of the fuel tank cap on an appropriate adapter, connected to a source of pressurized gas and to a vacuum source. The cap is sequentially subjected to pressurization and vacuum, and the integrity of the cap is monitored by recording the changes in pressure or vacuum over time. The test results are compared to reference values to determine the condition of the cap.

BRIEF DESCRIPTION OF THE DRAWINGS

A fuller understanding of the present invention and its specifications and features will be obtained upon consideration of the following detailed description of a preferred, but nonetheless illustrative embodiment of the invention when taken in conjunction with the annexed Figures, wherein.

DISCLOSURE OF THE INVENTION

Figure 1:
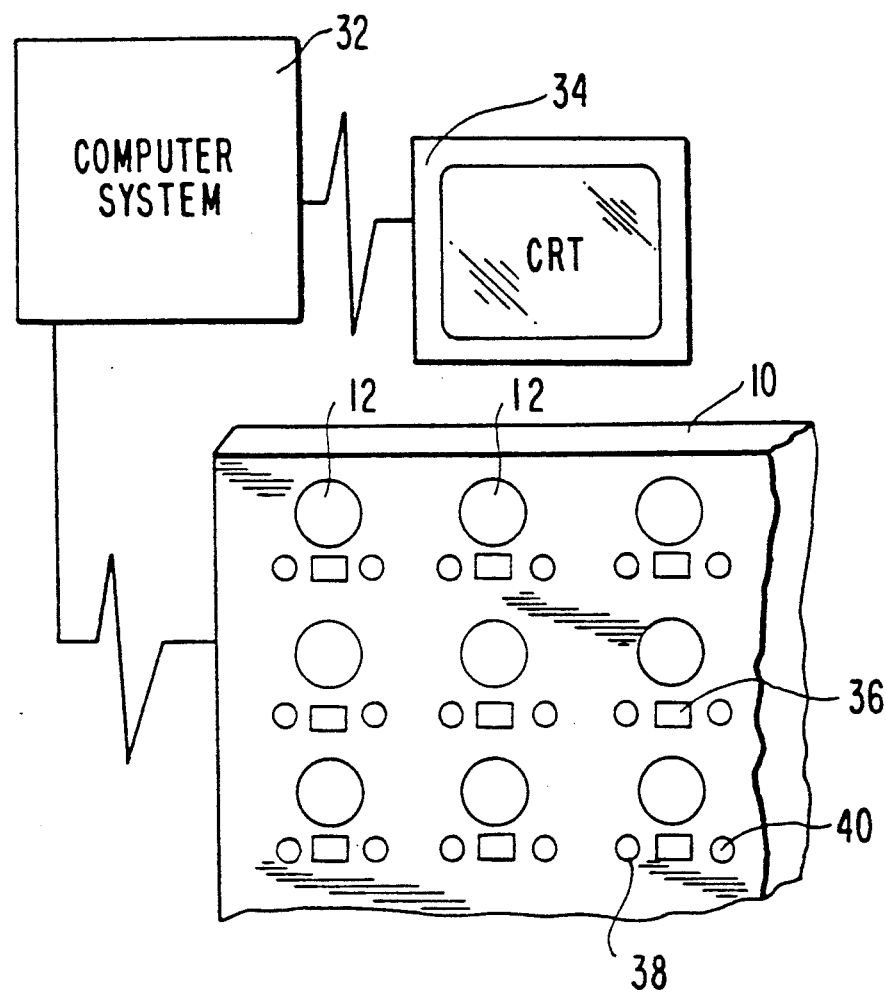
FIG. 1 is a representation of a test system incorporating the present invention.

As presented in FIG. 1, the present invention may comprise an array 10 of sockets 12, each of which is chosen to compliment a particular configuration of gas filler cap as may be utilized on a particular make and model of automobile. Each of the sockets may be fixed in the array, wherein the fuel cap to be tested is removed from the vehicle and brought to the apparatus, or alternatively, each of the sockets may itself be removable from the array, and capable of being brought to the automobile for testing of a cap which is tethered thereto.

Figure 2:
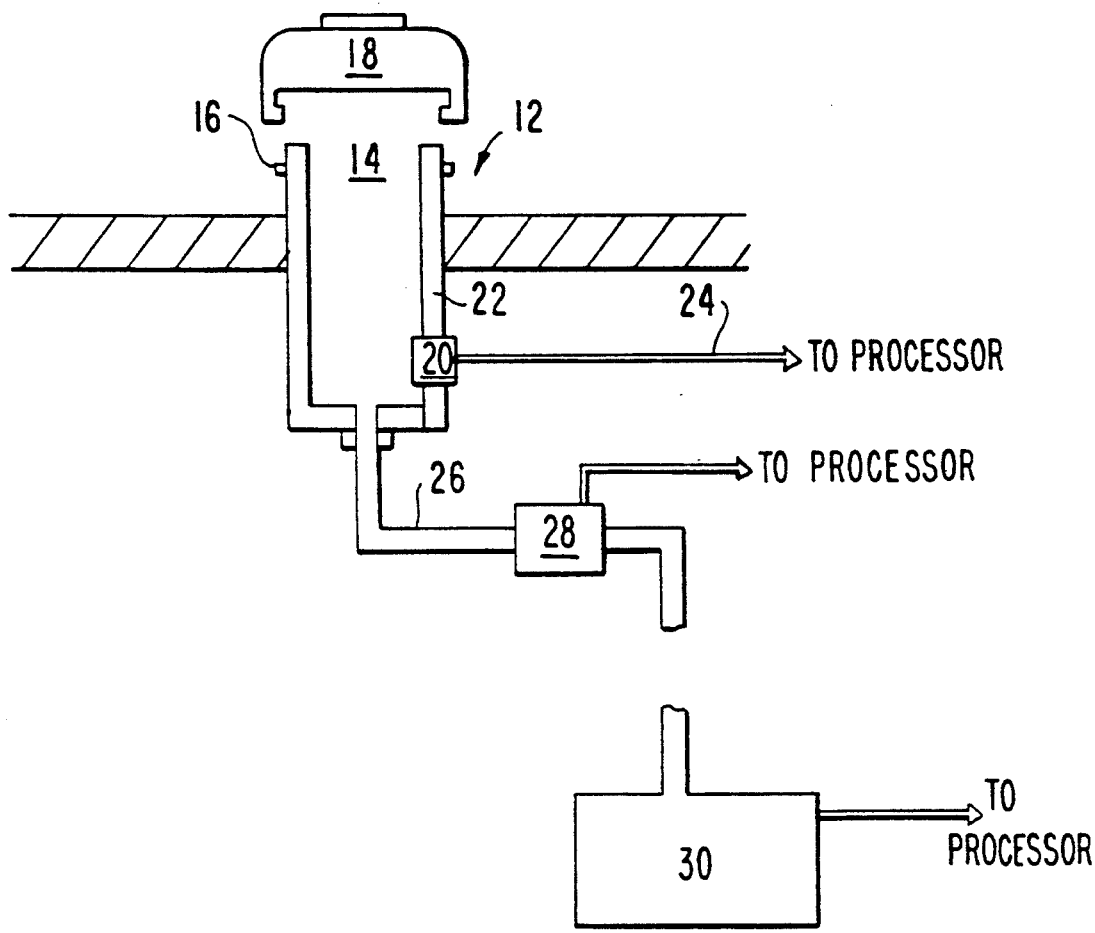
FIG. 2 is a representation of an adaptor utilized in the invention.

As depicted in FIG. 2, each socket has a first open end 14 designed to replicate the vehicle fuel filler line mouth, and is provided with appropriate flanges 16 adapted to mate with those on the fuel cap 18 intended to be tested. With a cap mounted thereon, the interior of the socket provides an air-tight chamber, the seal between the chamber and cap replicating vehicle conditions and allowing the integrity of the seal of the cap to be tested. An appropriate transducer 20, mounted in the side wall 22 of the socket, monitors the pressure within the socket body, and is responsive both to pressurization above ambient and vacuum levels below ambient. The transducer is connected by cable 24 to the processing equipment. A supply line 26 connects the interior of the socket through a valve 28 to a pressure and vacuum source 30. The source 30 may be a combination unit or alternatively comprise separate devices for vacuum and pressure, connected to the hose 26 by appropriate valves. The pressure and vacuum sources may be operated in turn by appropriate control means (not shown) to place the socket in a pressurized or vacuum state as required by the test protocol.

The cable 24 connects the transducer to computer system 32, which preferably may form the heart of a complete automotive emission system test apparatus as known in the art. The results of the test procedure may be displayed on CRT 34.

The test unit array 10 may include a socket switch and indicator light combination 36 associated with each socket. Activating the switch identifies the socket in use, and permits the computer system to monitor the associated transducer 20 and operate the associated valve 28 as required by the test protocol. The indicator portion may be utilized by the computer system to identify a particular socket in the array.

The test procedure is initiated by the test operator removing the gas cap from the vehicle and entering vehicle information into an appropriate input device for computer system 32. As the computer system is provided with a database of vehicles, the correct socket can be identified. The indicator light portion of indicator switch 36 may then be activated by the system to indicate the appropriate socket for mounting of the cap. The cap is then placed on the associated socket and locked into place in the same manner of application upon a gas tank filler neck. The switch 36 is then activated to confirm that the cap is on the proper socket and that the test can be commenced.

With receipt of the signal confirming cap mounting, the pressure source is activated, pressurization of the socket interior and thus the gas cap seal mechanism being monitored by the system through transducer 20. Indicator light 38 is illuminated to indicate that the test is in process and the cap should not be disturbed. When the appropriate test pressure for the cap is reached, pressurization is halted and valve 28 is closed to maintain the pressure. The system then monitors pressure drop, comparing any such changes to a predetermined and stored decay characteristic for the cap. After the test is completed, valve 28 is opened to release the pressure and the vacuum source is energized. Once again, transducer 20 monitors the reduction in pressure in the socket until a predetermined vacuum level is reached. At that time, the valve 28 is again closed and the socket monitored for loss of vacuum over a predetermined time. Upon completion of the vacuum test, the valve 28 is again opened, allowing the interior of the socket to reach ambient conditions, and the test protocol terminates. While the inclusion of both above and below-ambient conditions is preferred testing methodology, it is to be recognized that testing may alternatively include either above or below-ambient pressures as may be desired.

Upon completion of the test, the system determines whether the cap has met test requirements, displaying the test results on the CRT 34. Valve 28 is opened to allow the pressure in the socket interior to return to ambient. A second indicator light 40 on the apparatus may then be activated to indicate that the test is completed and that the gas cap may be safely moved from the adaptor.

The apparatus and method of the present invention as described provides for rapid and efficient automated evaluation of fuel tank caps, either as an independent test or as part of an integrated emission test protocol. In an alternative embodiment, the sockets 12 need not be fixed in the array 10, but can be provided with flexible electrical and pneumatic leads to allow the socket to be removed from the array and extended to the vehicle under test. This permits the test of caps which are tethered to the vehicle.

I claim:

1. An apparatus for the automated testing of vehicle fuel tank caps, comprising a plurality of socket means each adapted to receive a differing cap for testing and to form an air-tight chamber in association therewith; means for identifying a one of said socket means for receiving a cap associated with a given vehicle for testing; pressure monitoring means coupled to said socket means for monitoring the pressure within said chamber when said associated cap is received by said one of said socket means; means coupled to said chamber for varying the pressure therein; and means coupled to said pressure monitoring means for comparing the pressure within said chamber to reference values to determine the integrity of said associated cap.

2. The apparatus of claim 1, wherein said means for varying the pressure in said chamber comprise at least one of vacuum and pressurization means.

3. The apparatus of claim 2 further comprising means for sealing said chamber from said pressure varying means at a chosen pressure; said pressure comparing means comprising means for comparing the pressure within said sealed chamber to reference values over a selected test period.

4. The apparatus of claim 3, wherein said means for varying the pressure in said chamber further comprises means for alternating the application of a vacuum and above-ambient pressure to said chamber.

5. The apparatus of claim 3, wherein said comparison means comprises a computer system.

6. The apparatus of claim 5, wherein said means for varying the pressure in said chamber further comprises said computer system.

7. The apparatus of claim 1 wherein said identification means comprise a computer system and indicator light means associated with each of said sockets.

8. The apparatus of claim 7, wherein said identification means further comprise means to operatively connect said pressure varying means to the identified one of said sockets.

9. A method for testing the integrity of a vehicle fuel tank cap, comprising the steps of identifying a mating socket for the cap from a plurality of sockets and providing a visual signal associated with said mating socket; affixing said cap to said mating socket to form an air-tight chamber; connecting said chamber to a pressure source and placing said chamber at a selected pressure chosen from above and below ambient pressure conditions; sealing said chamber from said source; monitoring the pressure of said chamber over a selected period of time to obtain a pressure/time relationship; and comparing said pressure/time relationship to a reference to determine the integrity of said cap.

10. The method of claim 9, further comprising the steps of performing said connecting and succeeding steps at a first pressure above ambient and at a second pressure below ambient.

11. The method of claim 9, wherein said identification step comprises the entry of associated vehicle data into a computer system having a vehicle/cap database.

* * * * *